US008849339B2

(12) United States Patent
Anto et al.

(10) Patent No.: US 8,849,339 B2
(45) Date of Patent: Sep. 30, 2014

(54) CLOSED LOOP POWER CONTROL IN A HETEROGENEOUS NETWORK BY SELECTING AMONG SETS OF ACCUMULATIVE POWER STEP VALUES

(75) Inventors: Aram Anto, Stockholm (SE); Stefano Sorrentino, Solna (SE); Stefan Parkvall, Stockholm (SE); George Jongren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 224 days.

(21) Appl. No.: 13/463,119

(22) Filed: May 3, 2012

(65) Prior Publication Data

US 2013/0040675 A1 Feb. 14, 2013

Related U.S. Application Data

(60) Provisional application No. 61/522,929, filed on Aug. 12, 2011.

(51) Int. Cl.
| | |
|---|---|
| *H04W 52/04* | (2009.01) |
| *H04W 52/24* | (2009.01) |
| *H04W 52/22* | (2009.01) |
| *H04W 52/36* | (2009.01) |
| *H04W 52/40* | (2009.01) |

(52) U.S. Cl.
CPC ............ *H04W 52/226* (2013.01); *H04W 52/40* (2013.01); *H04W 52/244* (2013.01); *H04W 52/362* (2013.01)
USPC .......................................... 455/522; 455/444

(58) Field of Classification Search
None
See application file for complete search history.

(56) References Cited

U.S. PATENT DOCUMENTS

| 8,452,321 | B2 * | 5/2013 | Fodor et al. ................... 455/522 |
| 8,565,808 | B2 * | 10/2013 | Hosono et al. ................ 455/522 |
| 2006/0252450 | A1 * | 11/2006 | Wigard et al. ................. 455/522 |
| 2011/0194513 | A1 * | 8/2011 | Kim ............................. 370/329 |

FOREIGN PATENT DOCUMENTS

| WO | WO 2006/013497 A1 | 2/2006 |
| WO | WO 2006013497 A1 * | 2/2006 |
| WO | WO 2009/023228 A1 | 2/2009 |
| WO | WO 2009023228 A1 * | 2/2009 |

OTHER PUBLICATIONS

3rd Generation Partnership Project; 3GPP TS 36.212: Technical Specification Group Radio Access Network; Evolved Universal Terrestrial Radio Access (E-UTRA); Multiplexing and channel coding (Release 10), Jun. 2011.*

(Continued)

*Primary Examiner* — Temesgh Ghebretinsae
*Assistant Examiner* — Dong-Chang Shiue
(74) *Attorney, Agent, or Firm* — Myers Bigel Sibley & Sajovec, P.A.

(57) ABSTRACT

A method is provided in a wireless device for controlling output transmission power from the wireless device. A set is selected among a plurality of sets of power step values, which reside in a memory of the wireless device, responsive to criteria defined in the wireless device. A power control command is received from a radio network node. One of the power step values of the selected set is selected responsive to the power control command. The output transmission power from the wireless device is controlled responsive to the selected power step value. Related methods in radio network nodes and apparatuses are disclosed.

18 Claims, 11 Drawing Sheets

(56) References Cited

OTHER PUBLICATIONS

3GPP TS 36.212 V.10.2.0, Jun. 2011, "$3^{rd}$ Generation Partnership Project; Technical Specification Group Radio Access Network; Evolved Universal Terrestrial Radio Access (E-UTRA); Multiplexing and channel coding (Release 10)", pp. 1-78.

ETRI: "UE power control in heterogeneous networks", 3GPP Draft; R1-106306, $3^{rd}$ Generation Partnership Project (3GPP), 3GPP TSG-RAN WG1 Meeting #63, Jacksonville, USA, Nov. 15-19, 2010.

International Search Report Corresponding to International Application No. PCT/IB2012/053947; Date of Mailing: Feb. 5, 2013; 26 Pages.

Samsung: "Per Cluster Based Opportunistic Power Control", 3GPP Draft; R1-106052, $3^{rd}$ Generation Partnership Project (3GPP), 3GPP TSG-RAN WG1 Meeting #63, Jacksonville, USA, Nov. 15-19, 2010.

International Preliminary Report on Patentability; Application No. PCT/IB2012/053947; Date of Mailing: Feb. 18, 2014; 16 Pages.

\* cited by examiner

| | 1010 | 1020a | 1020b | | 1020n |
|---|---|---|---|---|---|

| Power control command value (2 bits) | First Set of power step values C [dB] | Second Set of power step values C [dB] | ... | N'th Set of power step values C [dB] |
|---|---|---|---|---|
| 0 | -1 | -3 | | Value 1 |
| 1 | 0 | 0 | | Value 2 |
| 2 | 1 | 5 | | Value 3 |
| 3 | 3 | 7 | | Value 4 |

*FIGURE 10*

CLOSED LOOP POWER CONTROL IN A HETEROGENEOUS NETWORK BY SELECTING AMONG SETS OF ACCUMULATIVE POWER STEP VALUES

RELATED APPLICATION

The present application claims the benefit of priority from U.S. Provisional Patent Application No. 61/522,929, filed Aug. 12, 2011, entitled "Closed-loop Power control method for LTE", the disclosure of which is hereby incorporated herein in its entirety by reference.

TECHNICAL FIELD

The present disclosure is directed to wireless communications and, more particularly, to controlling transmission power in a radio communications network.

BACKGROUND

In a typical cellular radio system, user equipment units (also referred to as UEs, wireless terminals, and/or mobile stations) communicate via a radio access network (RAN) with one or more core networks. The RAN covers a geographical area which is divided into cell areas, with each cell area being served by a radio network node (also referred to as a base station, a network node, a "NodeB", and/or enhanced NodeB "eNodeB" or "eNB").

Dynamic control of the UE transmission power is a common feature in cellular systems. The objectives of uplink power control include: (a) reaching a sufficient received power and signal quality on the used channel at the serving base station, (b) limiting the received power (interference) at non-serving base stations, (c) limiting the received power (interference) on non-used channels at the serving base station and (d) reducing the output power level to limit power consumption and save battery life in the UE.

Power control schemes can further be divided in to the categories "closed-loop" and "open-loop" depending on what type of measurement input is used. Closed-loop schemes make use of measurements on the same link direction that the power control applies to, i.e. on the uplink for uplink closed loop power control. Open-loop schemes make use of measurements on the opposite link direction, i.e. on the downlink for uplink open-loop power control. In comparison, closed-loop schemes are typically more accurate than open-loop schemes, but also require more control signaling overhead.

Improved support for heterogeneous network operations is part of the ongoing specification of 3GPP LTE Release-10, and further improvements are discussed in the context of new features for Release-11. In heterogeneous networks, a mixture of cells of differently sized and overlapping coverage areas are deployed. One example of such deployments is illustrated in FIG. 1 where pico cells 110 are provided by pico eNBs 112 deployed within the coverage area of a macro cell 100 provided by a macro eNB 102. Other examples of low power radio network nodes, also referred to as points, in heterogeneous networks are home base stations and relays. As will be further discussed below, the large difference in output power (e.g. 46 dBm in macro cells 100 and 30 dBm or less in pico cells 110) results in a different interference situation than what is seen in networks where all base stations have the same output power.

The aim of deploying low power nodes such as pico base stations 112 within the macro cell coverage area 100 is to improve system capacity by means of cell splitting gains as well as to provide users with wide area experience of very high speed data access throughout the network. Heterogeneous deployments can be particularly effective to cover traffic hotspots, i.e. small geographical areas with high user densities served by e.g. pico cells 110, and they represent an alternative deployment to denser macro networks.

One basic approach for operating heterogeneous networks is to provide frequency separation between the different layers. For example, the macro cell 100 and pico cell 110 in FIG. 1 can be configured to operate on different non-overlapping carrier frequencies and thereby avoid interference between the layers. With no macro cell interference towards the under laid cells (here exemplified by the pico cells 110 in FIG. 1), cell splitting gains are achieved when all resources can simultaneously be used by the under laid cells. The drawback of operating layers on different carrier frequencies is that it may lead to resource-utilization inefficiency. For example, with low activities in the pico cells 110, it could be more efficient to use all carrier frequencies in the macro cell 100 and then basically switch off the pico eNBs 112 use of certain frequencies to avoid interference. However, the split of carrier frequencies across layers is typically done in a static manner.

Another (related) approach for operating heterogeneous networks is to share radio resources on the same carrier frequencies by coordinating transmissions across macro and under laid cells. This type of coordination refers to as inter-cell interference coordination (ICIC) in which certain radio resources are allocated for the macro cells 100 during some time period whereas the remaining resources can be accessed by the under laid cells (e.g., pico cells 110) without interference from the macro cell 100. Depending on the traffic situations across the layers, this resource split can change over time to accommodate different traffic demands. In contrast to the above split of carrier frequencies, this way of sharing radio resources across layers can be made more or less dynamic depending on the implementation of the interface between the nodes. In LTE, an X2 interface has been specified in order to exchange different types of information between base stations. One example of such information exchange is that a base station can inform other base stations that it will reduce its transmit power on certain resources.

Time synchronization between base stations is required to ensure that ICIC across layers will work efficiently in heterogeneous networks. Synchronization can be particularly important for time domain based ICIC schemes where resources are shared in time on the same carrier.

LTE uses OFDM in the downlink and DFT-spread OFDM in the uplink. The basic LTE physical resource can thus be represented as a time-frequency grid of radio interface resources as illustrated in FIG. 2, where each resource element corresponds to one subcarrier during one OFDM symbol interval (on a particular antenna port).

In the time domain, LTE downlink transmissions are organized into radio frames of 10 ms, each radio frame consisting of ten equally-sized subframes of 1 ms as illustrated in FIG. 3. A subframe is divided into two slots, each of 0.5 ms time duration.

Resource allocation in LTE is defined in terms of resource blocks, where a resource block corresponds to one slot in the time domain and 12 contiguous 15 kHz subcarriers in the frequency domain. Two in time consecutive resource blocks represent a resource block pair and corresponds to the time interval upon which scheduling operates.

Transmissions in LTE are dynamically scheduled in each subframe where the base station transmits downlink assignments/uplink grants to certain UEs via the physical downlink control channel (PDCCH). The PDCCHs are transmitted in the first OFDM symbol(s) in each subframe and spans (more or less) the whole system bandwidth. A UE that has decoded a downlink assignment, carried by a PDCCH, knows which resource elements in the subframe that contain data aimed for the UE. Similarly, upon receiving an uplink grant, the UE knows which time/frequency resources it should transmit upon. In LTE downlink, data is carried by the physical downlink shared channel (PDSCH) and in the uplink the corresponding channel is referred to as the physical uplink shared channel (PDSCH).

Demodulation of sent data requires estimation of the radio channel which is done by using transmitted reference symbols (RS), i.e. symbols known by the receiver. In LTE, cell specific reference symbols (CRS) are transmitted in all downlink subframes and, in addition to assist downlink channel estimation, they are also used for mobility measurements and for uplink power control performed by the UEs. LTE also supports UE specific RS aimed only for assisting channel estimation for demodulation purposes.

FIG. 4 illustrates how the mapping of physical control/data channels and signals can be done on resource elements within a downlink subframe. In this example, the PDCCHs occupy the first out of three possible OFDM symbols, so in this particular case the mapping of data could start already at the second OFDM symbol. Since the CRS is common to all UEs in the cell, the transmission of CRS cannot be easily adapted to suit the needs of a particular UE. This is in contrast to UE specific RS which means that each UE has RS of its own placed in the data region of FIG. 4 as part of PDSCH.

The length of the control region, which can vary on subframe basis, is conveyed in the Physical Control Format Indicator CHannel (PCFICH). The PCFICH is transmitted within a control region, at locations known by UEs. After a UE has decoded the PCFICH, it thus knows the size of the control region and in which OFDM symbol the data transmission starts.

Also transmitted in the control region is the Physical Hybrid-ARQ Indicator Channel. This channel carries ACK/NACK responses to a UE to inform whether the uplink data transmission in a previous subframe was successfully decoded by the base station or not.

While PUSCH carries data in the uplink, PUCCH is used for communicating control. PUCCH is a narrowband channel using an RB pair where the two RBs are on opposite sides of the potential scheduling bandwidth. PUCCH is used for conveying ACK/NACKs, periodic CSI feedback, and scheduling request to the network.

Before an LTE UE can communicate with an LTE network it first has to find and acquire synchronization to a cell within the network, i.e. performing cell search. Then the UE receives and decodes system information needed to communicate with and operate properly within the cell, and finally the UE accesses the cell using a so-called random-access procedure.

In order to support mobility, a UE needs to continuously search for, synchronize to, and estimate the reception quality of both its serving cell and neighbor cells. The reception quality of the neighbor cells, in relation to the reception quality of the current cell, is then evaluated in order to conclude if a handover (for UEs in connected mode) or cell re-selection (for UEs in idle mode) should be carried out. For UEs in connected mode, the handover decision is taken by the network based on measurement reports provided by the UEs. Examples of such reports are reference signal received power (RSRP) and reference signal received quality (RSRQ). A UE uses these measurements, and may further use a configurable offset, to be connected to the cell with the strongest received power, or the cell with the best path gain, or something between the two. These selection strategies do not result in the same selected cell as the base station output powers of cells of different type are different. This is sometimes referred to as link imbalance. For example, the output power of a pico base station or a relay is in the order of 30 dBm or less, while a macro base station can have an output power of 46 dBm. Consequently, even in the proximity of the pico cell, the downlink signal strength from the macro cell can be larger than that of the pico cell. From a downlink perspective, it is often better to select a cell based on downlink received power, whereas from an uplink perspective, it would be better to select a cell based on the path loss. Various cell selection approaches are illustrated in FIG. 5 for a pico eNB 112 that provides a pico cell that is within a macro cell 100 provided by a macro eNB 102.

Referring to FIG. 5, in the above scenario, it may be a better case from a system perspective to connect to the pico eNB 112 even if the macro eNB 102 downlink is much stronger than the pico eNB 112 downlink. However, ICIC across layers would be needed when UEs operate within the region between an UL border 502 and a DL border 500 (the link imbalance zone) depicted in FIG. 5. Some form of interference coordination across the cell layers is especially important for the downlink control signaling. If this interference situation is not handled appropriately, a UE in the region between the UL border 502 and the DL border 500 in FIG. 5 and connected to the pico eNB 112 cannot receive the downlink control signaling from the pico eNB 112.

One approach of providing ICIC signaling across layers is illustrated in FIG. 6, where an interfering macro eNB (downlink interference towards a pico eNB) avoids scheduling unicast traffic in certain subframes, implying that neither PDCCHs nor PDSCH occur in those subframes. In this approach, it is possible to create low interference subframes, which can be used to protect UEs connected to pico ENBs and operating in the link imbalance zone. The macro eNB indicates via the backhaul interface X2 to the pico eNB which subframes it will avoid scheduling UEs within. The pico eNB can then take this information into account when scheduling users operating within the link imbalance zone; such that these UEs are scheduled in subframes aligned with the low interference subframes at the macro layer, i.e. in interference protected subframes. However, UEs connected to a pico ENB and operating within the DL border can be scheduled in all subframes, i.e. in both protected and non-protected subframes.

In principle, data transmission (but not control signaling) in different layers could also be separated in the frequency domain by ensuring that scheduling decisions in the two cell layers are non-overlapping in the frequency domain, e.g. by exchanging coordination messages between the different base stations. LTE specifications do not allow control signaling to span the full bandwidth and hence, a time-domain approach must be used.

Classical versus Single Cell Deployments

One prior art approach for deploying a network is to let different transmission/reception radio network nodes form separate cells. That is, the signals transmitted from or received at a radio network node are associated with a cell-id that is different from the cell-id employed for other nearby radio network nodes. Typically, each radio network node transmits its own unique signals for broadcast (PBCH) and sync channels (PSS, SSS).

The concept of a point (e.g., a radio network node) is often used in conjunction with techniques for coordinated multipoint (CoMP). In this context, a point corresponds to a set of antennas covering essentially the same geographical area in a similar manner. Thus a point might correspond to one of the sectors at a site, but it may also correspond to a site having one or more antennas all intending to cover a similar geographical area. Often, different points represent different sites. Antennas correspond to different points when they are sufficiently geographically separated and/or having antenna diagrams pointing in sufficiently different directions. Techniques for CoMP entail introducing dependencies in the scheduling or transmission/reception among different points, in contrast to conventional cellular systems where a point from a scheduling point of view is operated more or less independently from the other points.

The mentioned classical strategy of one cell-id per point is depicted in FIG. 7 for a heterogeneous deployment where a number of low power (pico) points 112 are placed within the coverage area of a higher power macro point 102, and provide service to various UEs 700. Note that similar principles may also apply to classical macro-cellular deployments where all points have similar output power and perhaps placed in a more regular fashion than what is the case for a heterogeneous deployment.

An alternative to the classical deployment strategy is to instead let all the UEs within the geographical area outlined by the coverage of the high power macro point 102 be served with signals associated with the same cell-id. In other words, from a UE perspective, the received signals appear coming from a single cell. This is illustrated in FIG. 8, which illustrates a heterogeneous radio communications network with a same cell-identifier assigned to each point (e.g., radio network node). Note that only one macro point 102 is shown, other macro points would typically use different cell-ids (corresponding to different cells) unless they are co-located at the same site (corresponding to other sectors of the macro site). In the latter case of several co-located macro points, the same cell-id may be shared across the co-located macro-points and those pico points 112 that correspond to the union of the coverage areas of the macro points. Sync, BCH and control channels are all transmitted from the high power point 102 while data can be transmitted to a UE 700 also from low power points 112 by using shared data transmissions (PDSCH) relying on UE specific RS. Such an approach has benefits for those UEs 700 that are capable of PDSCH based on UE specific RS while UEs 700 only supporting CRS for PDSCH (which is likely to at least include all Release 8/9 UEs for FDD) have to settle with the transmission from the high power point and thus will not benefit in the downlink from the deployment of extra low power points.

The single cell-id approach is geared towards situations in which there is fast backhaul communication between the points associated to the same cell. A typical case would be a base station serving one or more sectors on a macro level as well as having fast fiber connections to remote radio units (RRUs) playing the role of the other points sharing the same cell-id. Those RRUs could represent low power points with one or more antennas each. Another example is when all the points have a similar power class with no single point having more significance in than the others. The base station would then handle the signals from all RRUs in a similar manner.

A clear advantage of the shared cell approach compared with the classical one is that the typically involved handover procedure between cells only needs to be invoked on a macro basis. Another important advantage is that interference from CRS is greatly reduced since CRS does not have to be transmitted from every point. There is also much greater flexibility in coordination and scheduling among the points which means the network can avoid relying on the inflexible concept of semi-statically configured "low interference" subframes, as illustrated in FIG. 6. A shared cell approach also allows decoupling of the downlink with the uplink so that for example path loss based reception point selection can be performed in uplink while not creating a severe interference problem for the downlink, where the UE 700 may be served by a transmission point different from the point used in the uplink reception. Typically, this means that the UE's 700 transmissions are received by a pico point 112, while in downlink the UE 700 receives from the macro point 102.

Uplink Power Control in LTE

According to Rel-10 LTE, UL power control (PC) is performed by estimating a path loss (PL) term and by combining it with various UE and cell-specific power offset terms. An example PC formula from Rel-10 is shown in Equation 1, below:

$$P=\min(P_{max}, 10\log10(M+P_0+\alpha*PL+C)) \text{ [dBm]}, \quad (1)$$

where $P_{max}$ represents a cap on the output power (in dBm), M represents the scheduled UL bandwidth, $P_0$ is a UE and/or cell-specific power offset, $\alpha$ is a cell-specific fractional path loss compensation factor, PL is an estimate of the path loss performed by the UE.

C is a correction term set by the closed-loop power control algorithm, which measures the received power at the base station and compares it to a target power (i.e. $P_0$). Based on that, the base station sends explicit power control commands which instruct the UE to update the value of the term C. The update can be done either through accumulative steps, which are added to the current value of C, or by setting C to an absolute new value. The different possible accumulative steps are [−1, 0, 1, 3] dB and the absolute values are [−4, −1, 4, 1] dB. The power control commands are sent through the downlink control channel (PDCCH), either through scheduling grants or through two dedicated DCI formats (3, 3A) if the UE doesn't transmit data on the uplink.

A UE can regulate its transmit power based on the CRSs and a reference power level transmitted by a macro node, which means that in case the UE is served by a macro node in the downlink and a pico node in the uplink, the RSRP measurement that determines transmit power will not take the received power at the pico node into account. This implies that the UE can transmit with a power level that makes the received power in the pico node be far above what is determined by the macro node. The network may then employ so called closed loop power control to steer the UE's output power to a value that it sees fit.

The difference between the actual and the desired transmit power is thus dependent on the UE position and the transmission power levels of the different nodes in the heterogeneous network. As a consequence, the closed-loop power control algorithm may need a large number of accumulative power-control commands in order to adjust UE transmission power to the desired level. In case of mobility, the number of power control messages implies an undesirable increase of the signaling overhead in the downlink on the possibly saturated PDCCH resources. Furthermore, in case of mobility, the closed loop power control mechanism might not be able to track the desired power control level with sufficient accuracy.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

It is therefore an object to address at least some of the above mentioned disadvantages and/or to improve performance in a wireless communication system.

Some embodiments of the present invention are directed to a method in a wireless device for controlling output transmission power from the wireless device. The wireless device selects one set among a plurality of sets that each contain a plurality of power step values, residing in a memory of the wireless device, responsive to criteria defined in the wireless device. At least some of the power step values are different between the sets. The wireless device receives a power control command, selects one of the power step values of the selected one of the sets responsive to the power control command, and controls the output transmission power from the wireless device responsive to the selected power step value.

The power step values in the different sets can have sizes (magnitudes) that are optimized for particular uplink power control situations. For example, one set can have larger magnitude power step values than another set to cause the wireless device to make correspondingly larger power changes responsive to power control commands from a serving radio network node. The wireless device can be controlled to use the set with the larger values when faster power adjustment is desired to compensate for larger transmit power mismatches, which can occur in various heterogeneous network scenarios.

Some other embodiments are directed to a method in a radio network node for controlling output transmission power from a wireless device. The radio network node selects one set among a plurality of sets that each contains a plurality of power step values responsive to criteria defined in the radio network node. At least some of the power step values are different between the sets. The radio network node transmits a set selection command to the wireless device responsive to the selected set to control the wireless device to select a corresponding one set among a plurality of sets that each contain a plurality of power step values residing in a memory of the wireless device. The radio network node selects one of the power step values of the selected set, and transmits a power control command to the wireless device responsive to the selected power step value to control the wireless device to select a corresponding one of the power step values of the selected corresponding set residing in the memory of the wireless device for controlling the output transmission power from the wireless device.

Some other embodiments are directed to a wireless device. The wireless device includes at least one transceiver configured to communicate with a plurality of radio network nodes in the radio communications network. A memory is configured to contain a plurality of sets that each containing a plurality of power step values, wherein at least some of the power step values are different between the sets. A processor circuit is configured to select one set among the plurality of sets containing the power step values responsive to criteria defined in the wireless device, configured to receive a power control command through the at least one transceiver from a first radio network node, configured to select one of the power step values of the selected set responsive to the power control command, and configured to control output transmission power from the at least one transceiver to a second radio network node responsive to the selected power step value.

Some other embodiments are directed to a radio network node of a radio communications network. The radio network node includes a network interface configured to receive measurement reports from another radio network node that contain power measurements of uplink signals received by the other radio network node from a wireless device. At least one transceiver is configured to transmit signals to the wireless device. A processor circuit is configured to select one among a plurality of sets that each contain a plurality of power step values responsive to criteria defined in the radio network node, wherein at least some of the power step values are different between the sets. The processor circuit transmits a set selection command through the at least one transceiver to the wireless device responsive to the selection set to control the wireless device to select a corresponding one set among a plurality of sets that each contain a plurality of power step values residing in a memory of the wireless device. The processor circuit selects one of the power step values of the selected set responsive to one of the measurement reports. The processor circuit transmits a power control command through the at least one transceiver to the wireless device responsive to the selected power step value to control the wireless device to select a corresponding one of the power step values contained in the selected corresponding set residing in the memory of the wireless device for controlling the output transmission power from the wireless device to the other radio network node Other wireless devices, radio network nodes, and methods according to embodiments of the invention will be or become apparent to one with skill in the art upon review of the following drawings and detailed description. It is intended that all such additional wireless devices, radio network nodes, and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 10 illustrates sets of power step values that can be selected among responsive to various criteria to control the output transmission power from a UE in accordance with some embodiments;

DETAILED DESCRIPTION

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in another embodiment.

For purposes of illustration and explanation only, various embodiments of the present invention are described herein in the context of operating in a 3GPP ($3^{rd}$ Generation Partnership Project) Long Term Evolution (LTE) heterogeneous radio communications network. It will be understood, however, that the present invention is not limited to such embodiments and may be embodied generally in any type of radio communications network.

Although the description below focuses, for purposes of illustration, on embodiments in which the described techniques are utilized with respect to managing the transmission power of a UE, the described techniques may be applied with respect to any wireless device capable of transmitting information wirelessly. As used herein, wireless device may include any device that can communicate through one or more wireless RF channels with a radio network node, and may include, but is not limited to, a mobile telephone (cellular telephone), wireless terminal, mobile station, laptop/portable computer, tablet computer, desktop computer, electronic book reader, and/or game console. Additionally, the wireless devices described herein may include devices that are somehow limited in their two-way communication capabilities or that otherwise lack some of the capabilities of the example UE. For example, the described wireless devices may represent meters, detectors, or identification tags that are capable of transmitting information to the wireless network, but that can only receive certain types of information (e.g., power control commands) from the network or that can only receive information at certain, predetermined times. Furthermore, these wireless devices may include not only mobile devices such as the example UE, but also devices that are fixed, installed in a particular location, or otherwise limited in their movement.

Example Radio Communications Network

Figure 1:
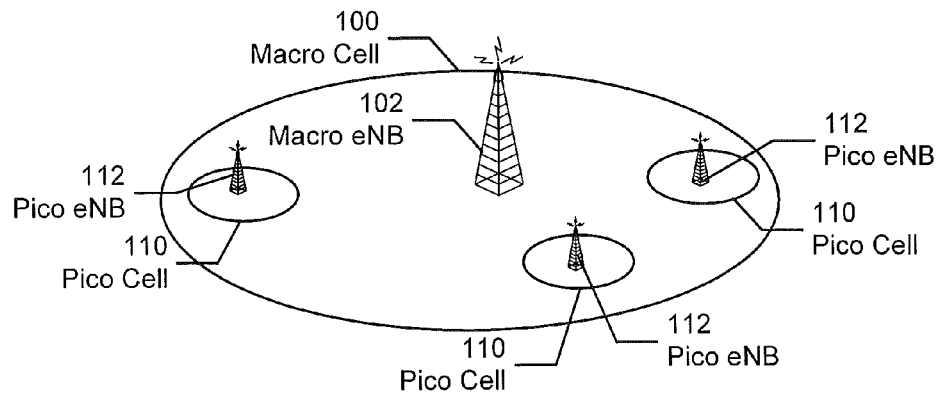
FIG. 1 is a block diagram of a heterogeneous radio communications network that includes a plurality of pico cells that are located within a macro cell.
Figure 2:
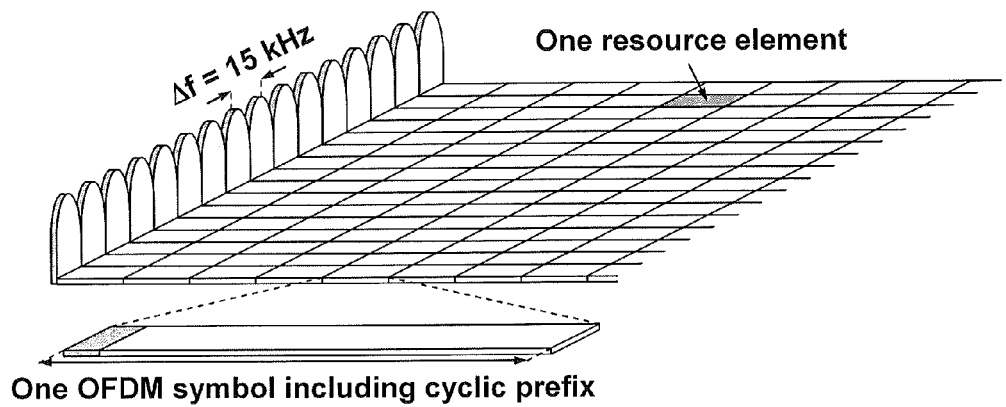
FIG. 2 illustrates a time-frequency grid of radio interface resources that can be used for communications between a radio network node and a UE.
Figure 3:
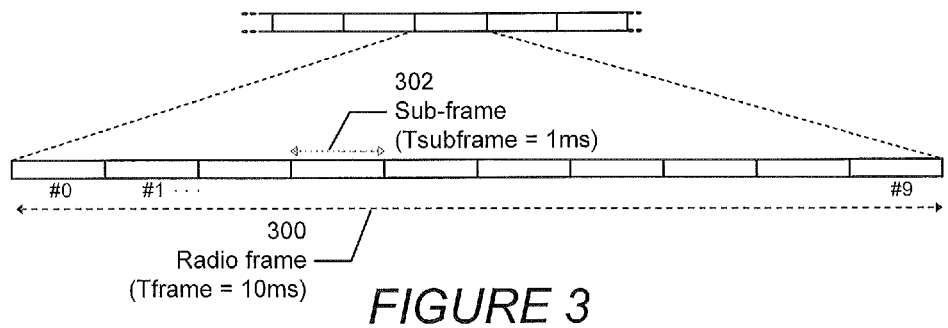
FIG. 3 illustrates example subframes of a radio frame.
Figure 4:
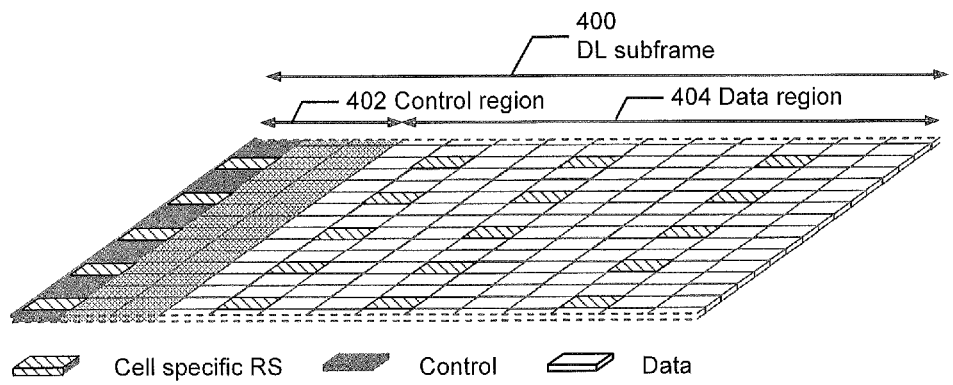
FIG. 4 illustrates an example grid mapping physical control/data channels and signals to resource elements within a downlink subframe.
Figure 5:
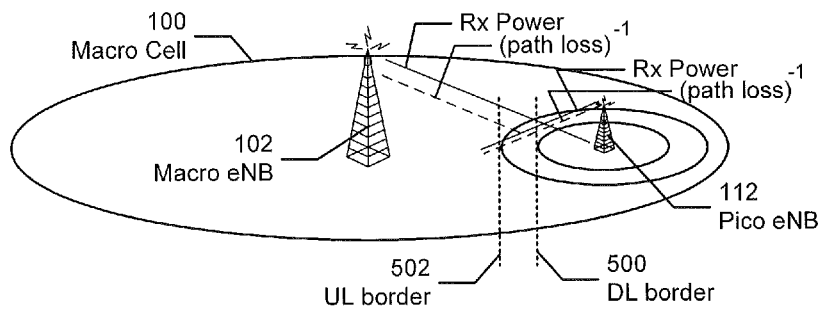
FIG. 5 illustrates uplink and downlink coverage between overlapping heterogeneous radio network cells of a radio communications network.
Figure 6:
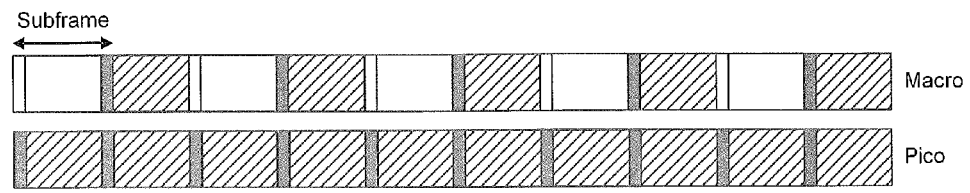
FIG. 6 illustrates example inter-cell interference coordination signaling using low interference subframes in downlink.
Figure 7:
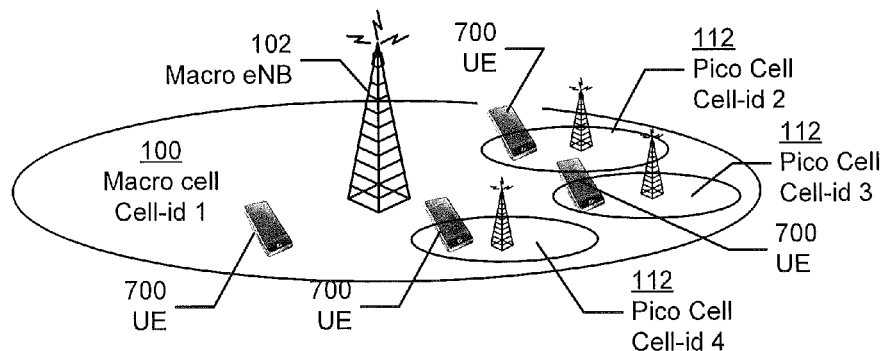
FIG. 7 illustrates a heterogeneous radio communications network with different cell-identifiers assigned to each radio network node.
Figure 8:
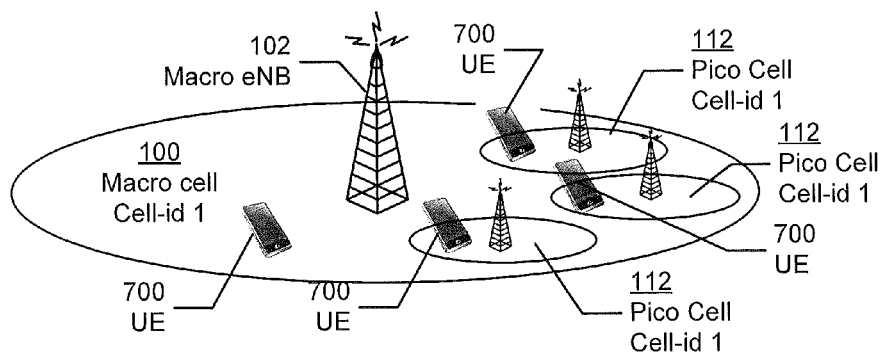
FIG. 8 illustrates a heterogeneous radio communications network with a same cell-identifier assigned to each radio network node.
Figure 9:
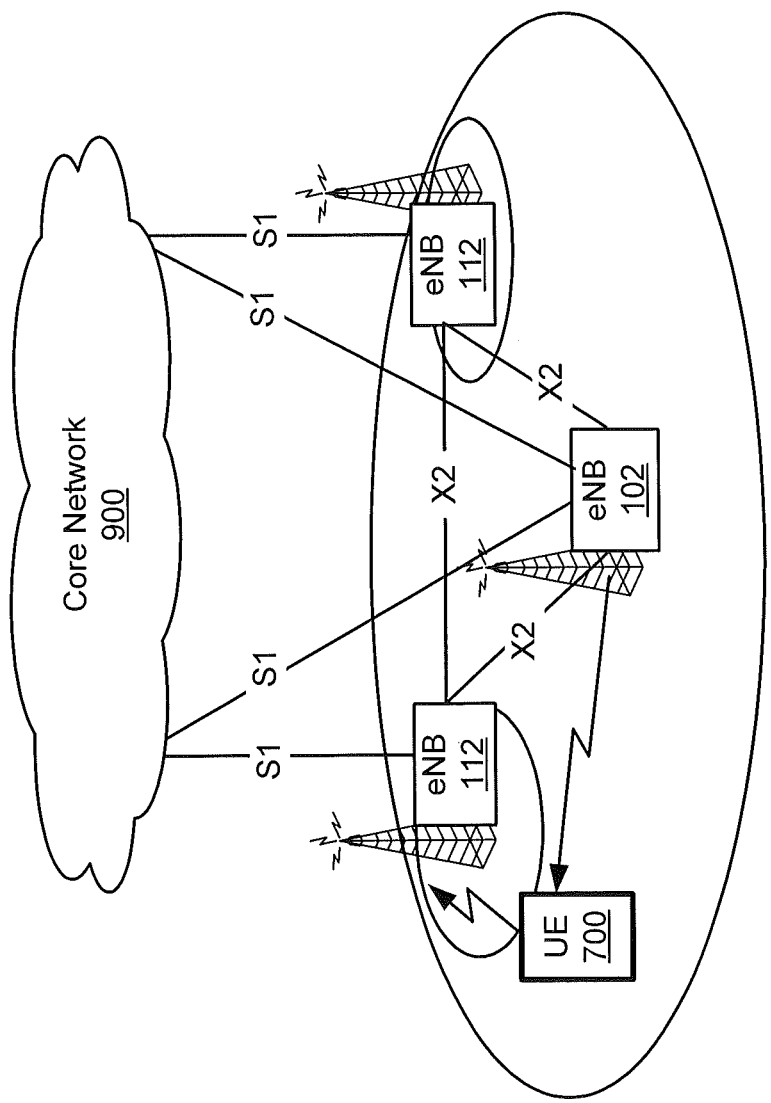
FIG. 9 illustrates a heterogeneous radio communications network that is configured to operate according to some embodiments.

FIG. 9 is a block diagram of a heterogeneous radio communications network that is configured to operate according to some embodiments of the present invention. The example radio communications network may be a Long Term Evolution (LTE) network. The network includes a first network node eNB 102 (e.g., macro base station) that has a larger cell than a pair of second network nodes eNBs 112 (e.g., pico/femto base stations). The smaller cells provided by the second network nodes eNBs 112 are within the larger cell provided by the first network node eNB 102.

The first and second network nodes eNBs 102 and 112 may be connected to communicate with one or more core networks 900 through Si interfaces, and may be connected to communicate with each other through X2 interfaces, as is well known to one who is skilled in the art.

A UE 700 can be controlled to simultaneously transmit and receive signals with the first network node eNB 102, or controlled to simultaneously transmit and receive signals with either of the second network nodes eNBs 112. The UE 700 can alternatively be controlled by one or more of the eNBs to receive signals from the first network node eNB 102 while transmitting signals to one of the second network nodes eNB 112 (as depicted in FIG. 9).

Uplink Power Control using Sets of Power Step Values

The UE 700 can regulate its transmit power based on the cell specific reference symbols (CRSs) and a reference signal received power (RSRP) transmitted by a radio network node. When the UE 700 is served by a macro eNB 102 in the downlink and served by the pico eNB 112 in the uplink, the RSRP measurement that determines uplink transmit power may not take the received power level at the pico eNB 112 into account. Consequently, the UE 700 may transmit at a power level that can cause the received power at the pico eNB 112 to be far above what is determined by macro eNB 102. The radio communications network may employ a closed loop power control to steer the UE's 700 output transmission power to a desired level. Various embodiments disclosed herein may enable the closed loop power control to more quickly adjust the uplink transmission power from the UE to provide improved transmission power management in the radio communications network.

The difference between the actual and the desired transmit power depends on the location of the UE 700 relative to the radio network nodes it communicates with in the heterogeneous network, and the relative transmission power levels of the radio network nodes. In accordance with various embodiments herein, the closed-loop power control algorithm can utilize a plurality of sets of power step values. The radio network node can control the UE 700 to select among the sets in response to defined criteria.

One of the sets can have larger magnitude power step values than another one of the sets to control the UE 700 to make corresponding larger power changes responsive to a power control command received from a serving radio network node. The set with the larger magnitude step values can be selected for use by the UE 700 under various defined criteria to provide faster uplink power adjustment by the UE 700. Example criteria are described further below.

By way of further example, a network node can control uplink transmission power by the UE 700 by estimating a path loss (PL) term and by combining it with various UE and cell-specific power offset terms. The power control algorithms used the network node may be based on Equation (1) described above and repeated below:

$$P=\min(P_{max}, 10\log10(M+P_0+\alpha*PL+C)) \text{ [dBm]},$$

where $P_{max}$ represents a cap on the output power (in dBm), M represents the scheduled UL bandwidth, $P_0$ is a UE 700 and/or cell-specific power offset, $\alpha$ is a cell-specific fractional path loss compensation factor, PL is an estimate of the path loss performed by the UE 700.

C is a correction term that is controlled by the closed-loop power control algorithm responsive to measurements of the received power at the radio network node and comparison of the measurements to a target power (i.e. $P_0$). Based on the comparison, the radio network node sends explicit power control commands to the UE 700 which instruct the UE 700 to update the value of the correction term C. The power control commands can be sent through the downlink control channel (PDCCH), either through scheduling grants or through two dedicated DCI formats (3, 3A) if the UE 700 doesn't transmit data on the uplink.

The power control commands can be used by the UE 700 to select an power step value from among one of the plurality of sets of power step values. The UE 700 can add the selected power step value to the current value of the correction term C to provide an updated correction term C, which is used to control the output transmission power level from the UE 700. Alternatively, the updated correction term C can be generated by setting the correction term C to an absolute new value that is indicated by a power control command and/or other signaling received by the UE 700 from the radio network node.

In accordance with various embodiments, the magnitude of the power step values, which are added to the correct term C by the closed-loop power control algorithm, are selectively increased when it is desired to cause more rapid changes in the output transmission power from the UE 700. Increased power step values can be used to cause faster power adjustment when the algorithm is compensating for large mismatches of the UE 700 transmit power, which can occur in various heterogeneous network scenarios such as described below.

A plurality of sets of power step values are provided in a memory of the UE 700. At least some of the power step values can be different between the sets. The closed loop power control algorithm performed by the radio network node can control which of the sets are selected for use by the UE 700 to control the rate of change of uplink transmission power from the UE 700. The radio network node may control the UE 700 to select a set of power step values that causes smaller output transmission power when the transmit power mismatches are smaller.

The need for larger size (magnitude) power step values is motivated by the fact that in new heterogeneous radio communications networks, significantly larger UE transmit power mismatches can occur compared to homogeneous radio communications networks. The larger UE transmit power mismatches can be caused by very different transmit power levels for different radio network nodes (e.g., Macro and Pico base-stations). Because macro eNBs 102 can transmit at much higher power levels than pico eNBs 112, a UE 700 that is closer to a pico eNB 112 than to its serving macro eNB 102 may still be served in the downlink by the macro eNB 102. Such a UE 700 may set its transmit power level in order to reach the macro eNB 102 in the uplink, despite the fact that it may be sufficient for the UE 700 to set its transmit power level to reach the closer pico eNB 112 serving it in the uplink.

As a result, UEs may face greater power mismatches in heterogeneous networks than in homogeneous networks. In accordance with some embodiment, the UE 700 is controlled to utilize larger incremental power correction steps to correct occurrence of UE transmit power mismatch in a shorter time, which can avoiding problems such as reduced battery life or high interference to other nodes due to excessively high UE transmit power.

In some embodiments, the macro eNB 102 (or another network node of the mobile communication system) may be responsible for making a determination as to which of the plurality of sets of power step values are to be used by the UE 700 and the timing for when a selected set is to be used. In some embodiments, the macro eNB 102 selects one set among the plurality of sets of power step values. For example, in one embodiment, the macro eNB 102 selects either a first set or a second set, where the second set includes one or more power steps that are larger than corresponding steps in the first set. After selecting a set, the macro eNB 102 indicates (e.g., by itself transmitting signaling or causing another network node to transmit signaling) to the relevant UE 700 an indication of the selected set of power step values, and may further indicate a particular one of the power step values within the selected set that is be to used by the UE 700 to control its output transmission power.

The macro eNB 102 may make the determination of when to use the second set of power step values (e.g., larger step values) in any suitable manner using any appropriate criteria. In some embodiments, the macro eNB 102 makes this determination based on the current transmission power level of the relevant UE 700 and the target power level for that UE 700. For example, the macro eNB 102 may select among the sets of power step values for use to control output transmission power based on the difference between the current received power level from the UE 700 and its target power level. Additionally, the macro eNB 102 may make the determination at any suitable time during operation. In one embodiment, the determination may be made in response to certain events occurring in the network.

Thus, use of the larger size power correction steps (e.g., the second set containing larger magnitude power step values) by the UE 700 can be triggered in different possible ways. A few non-limiting approaches for controlling selection among the sets of according to some embodiments are described below.

Approach 1: For the UE 700, use of the larger power correction steps (e.g., the second set containing larger magnitude power step values) may be triggered through receipt of control messages sent by the macro eNB 102 corresponding to a new downlink control message format. In a further embodiment, the size of control messages under this format is set equal to other existing DCI formats, in order to avoid increasing complexity at the UE 700 when decoding the downlink control channel, since no additional blind decodes are introduced. Following the same format of some of the existing DCIs used for sending TPC commands, the command to each UE 700 is defined by two bits, which results in four possible values for the correction term C. The values are chosen in order to complement already existing values. Non-limiting example sets set of power step values, together with existing power step values for the correction term C are shown in FIG. 10. This new DCI format may be used (although not necessarily) in conjunction with alternative or additional Approaches (2) or (3) below.

FIG. 10 illustrates sets of power step values that can be selected among responsive to various criteria to control the output transmission power from the UE 700 in accordance with some embodiments. The sets of power step values can be stored in a memory of the UE 700, and a network node can control the UE 700 to select one of the sets, and to further select one of the power step values within the selected set, for use in controlling the output transmission power from the UE 700. Referring to FIG. 10, "n" different sets of power step values C 1020*a*. . . 1020*n* (where n is a plural number) are stored in a memory of the UE 700. The network node can respond to defined criteria to control the UE 700 to select a particular one of the sets, and can further use power control commands 1010 (which are each shown as being two bits), to further control the UE 700 select a particular one of the four available power step values (of the selected one of the sets 1020*a-n*) for the correction term C.

Approach 2: For the UE 700, use of the larger power correction steps (e.g., the second set containing larger magnitude power step values) may alternatively or additionally be triggered through RRC or MAC protocol signaling between the macro eNB 102 and the UE 700.

Approach 3: In general, use of the larger power correction steps (e.g., the second set containing larger magnitude power step values) may also be triggered dynamically. Larger size power steps may be triggered based on a certain signal or event at the network. An example of such an event is a change of the set of pathloss measurement reference symbols measured at the UE 700. In response to detecting the relevant signal has been transmitted or event has occurred, the macro eNB 102 may then decide to use the larger power correction steps and instruct the UE 700 accordingly using, for example, the techniques described in Approaches 1 and 2 above.

By way of further example, a radio network node can control the UE 700 to select a set of smaller magnitude power step values responsive to identifying occurrence of smaller transmit power mismatches such as when the UE 700 is transmitting and receiving signals with a same radio network node, or when the UE 700 is transmitting signals to a smaller cell network node (e.g., pico eNB 112) while receiving signals from a larger cell network node (e.g., macro eNB 102) and located relatively further from the small cell network node. In contrast, the radio network node can control the UE 700 to select a set of larger magnitude power step values responsive to identifying occurrence of larger transmit power mismatches such as when the UE 700 is transmitting to the smaller cell network node (e.g., pico eNB 112) while receiving signals from the larger cell network node (e.g., macro eNB 102) and located relatively close to the small cell network node.

Selection of a set of larger magnitude power step values can be triggered by, for example, RRC/MAC protocol signaling, dynamically (based on certain events at the network), and/or by an extra DCI format similar to existing DCI formats dedicated to sending power control commands (i.e. DCI format 3).

The radio network node that controls the UE 700 to select among the sets of power step values and which further controls which of the power step values are used within a selected set, can be a different radio network node that is receiving signals from the UE 700.

Various operations and methods that may be performed by a UE 700 for controlling output transmission power from the UE will be described in the context of the flowcharts of FIGS. 11-15.

Figure 11:
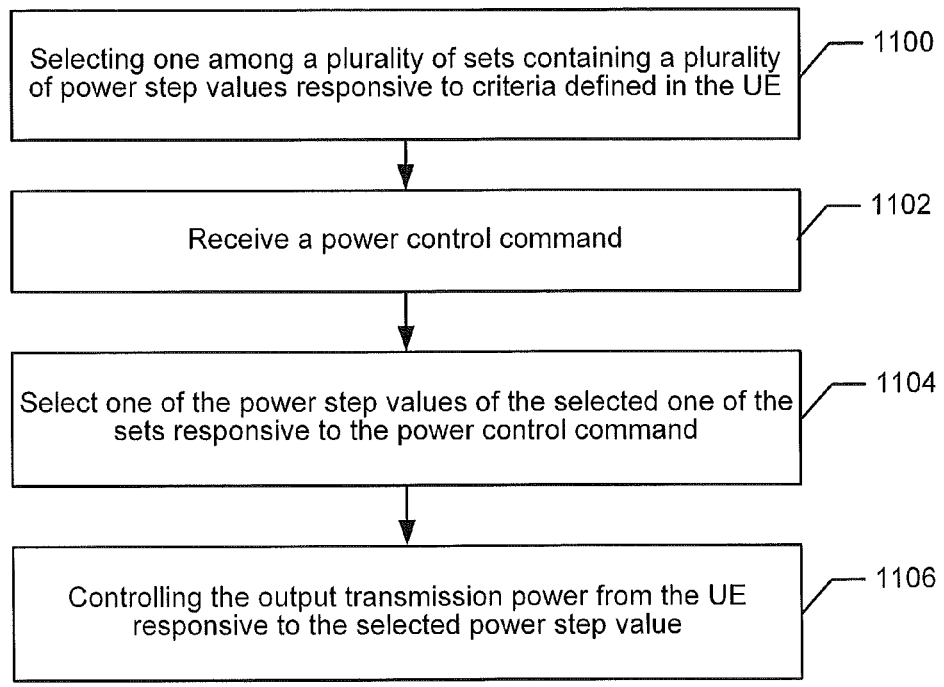
FIGS. 11-15 are flow charts of operations and methods that can be performed by UEs to control output transmission power according to some embodiments.

Referring to FIG. 11, the UE is controlled, responsive to criteria defined in the UE, to select (block 1100) one set among a plurality of sets that each contain a plurality of power step values residing in a memory of the UE (e.g., select among the sets 1020a. . . 1020n of FIG. 10). The plurality of power step values residing in the memory of the UE may be stored in the memory prior to the UE initiating communication with the radio network, or may be communicated to the UE by the radio network (e.g., as part of the system information of the relevant radio network node) and stored in memory by the UE. At least some of the power step values are different between the sets. The UE receives (block 1102) a power control command from a radio network node. The UE selects (block 1104) one of the power step values of the selected one of the sets responsive to the power control command. The UE then controls (block 1106) the output transmission power from the UE responsive to the selected power step value.

The criteria defined in the UE may cause the UE to select a set responsive to a set selection command received from a network node, and/or may cause the UE to determine which of the sets to select responsive to defined events that are observable to the UE. Accordingly, the UE may operate completely dependent upon instructions from a network node or may operate at least partially independent of any such instructions when deciding which of the sets of power step values it will use to control its transmission power level, as described in further detail below.

Figure 12:
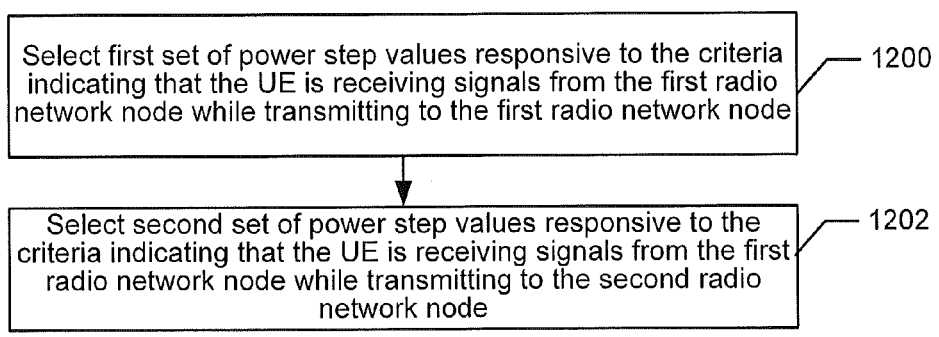

In a further embodiment shown in FIG. 12, the power control command is received in a downlink from a first radio network node of a heterogeneous network that also includes a second radio network node. The first radio network node provides a different communication service cell size than the second radio network node. When selecting among the plurality of sets, the UE can select (block 1200) a first one of the sets responsive to the criteria indicating that the UE is receiving signals from the first radio network node while transmitting to the first radio network node, and can select (block 1202) a second one of the sets responsive to the criteria indicating that the UE is receiving signals from the first radio network node while transmitting to the second radio network node.

Accordingly, when the UE is receiving and transmitting signals with the macro eNB 102 or the pico eNB 112, the UE can select the first set of power step values for use in controlling its output transmission power level. In contrast, the UE can select the first set of power step values for use in controlling its output transmission power level when it is receiving signals from the macro eNB 102 and transmitting signals to the pico eNB 112. The second set can comprise larger magnitude power step values than the first set to control the UE to make corresponding larger power changes responsive to the power control command.

Figure 13:
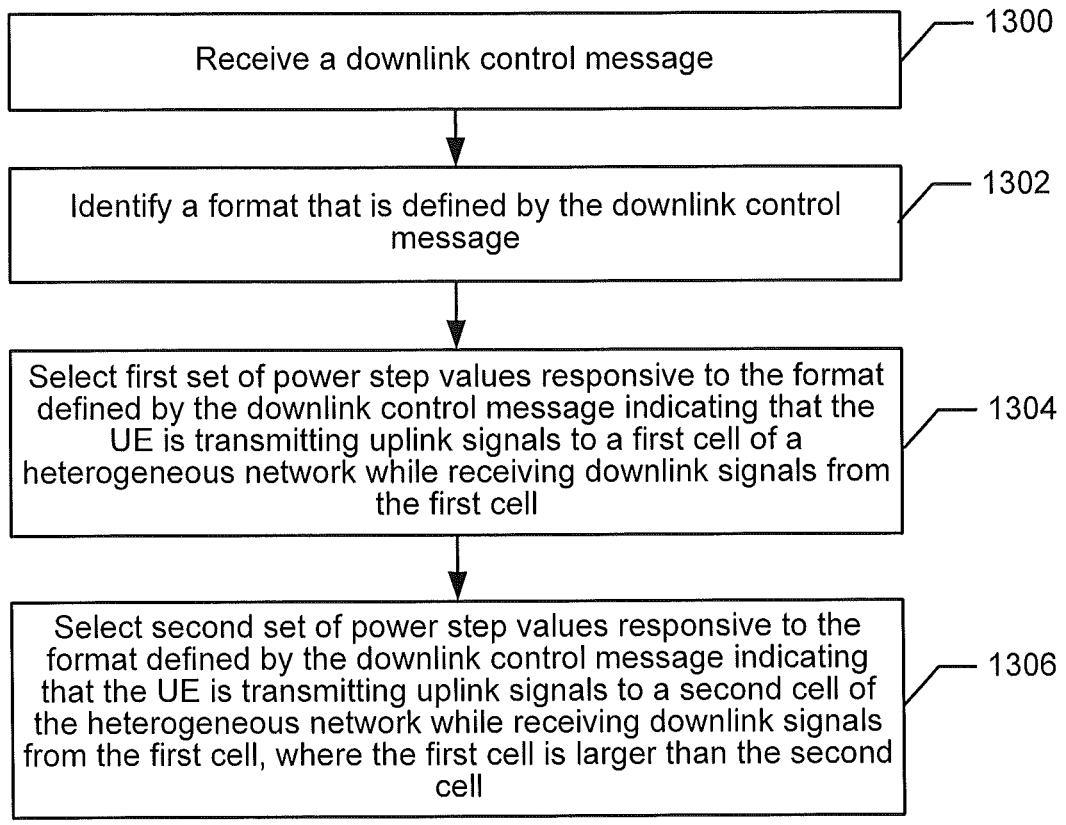

In a further embodiment shown in FIG. 13, when selecting among the plurality of sets, the UE can receive (block 1300) a downlink control message and identify (block 1302) a format that is defined by the downlink control message. The UE can then select (block 1304) a first one of the plurality of sets responsive to the format defined by the downlink control message indicating that the UE is transmitting uplink signals to a first cell of a heterogeneous network while receiving downlink signals from the first cell. In contrast, the UE can select (block 1306) a second one of the plurality of sets responsive to the format defined by the downlink control message indicating that the UE is transmitting uplink signals to a second cell of the heterogeneous network while receiving downlink signals from the first cell, wherein the first cell is larger than the second cell. The second set can comprise larger magnitude power step values than the first set to control the UE to make a larger power change responsive to each power control command received from a radio network node, which may operate to provide the first or second cell.

Figure 14:
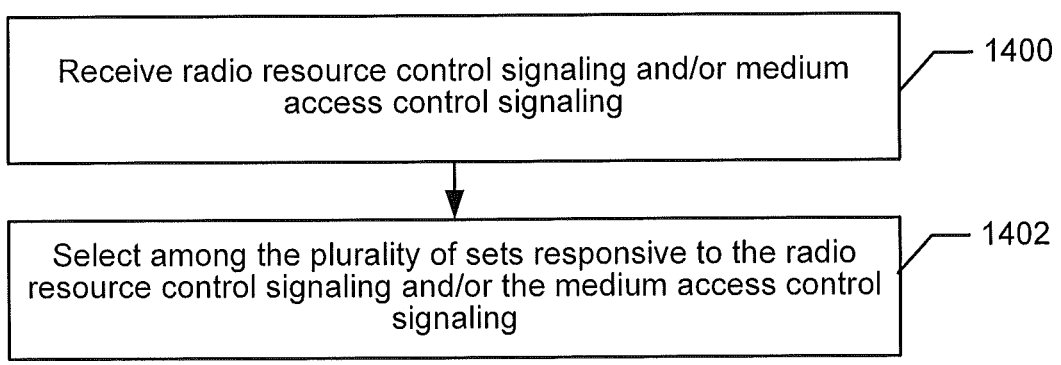

In a further embodiment shown in FIG. 14, the UE may select among the sets of power step values responsive to radio resource control signaling and/or medium access control signaling received from the network node. For example, the UE can receive (block 1400) radio resource control signaling and/or medium access control signaling from the radio network node, and can respond thereto by selecting (block 1402) among the plurality of sets.

Figure 15:
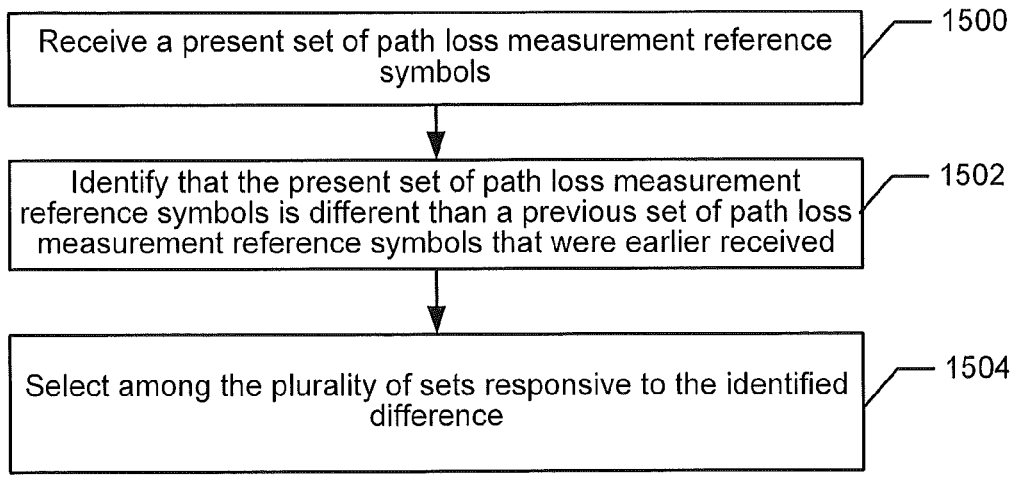

In a further embodiment shown in FIG. 15, the UE may select among the sets of power step values responsive to a change in a set of path loss measurement reference symbols measured at the UE. For example, the UE can receive (block 1500) a present set of path loss measurement reference symbols, identify (block 1502) that the present set of path loss measurement reference symbols is different than a previous set of path loss measurement reference symbols that were earlier received, and select (block 1504) among the plurality of sets responsive to the identified difference.

Various operations and methods that may be performed by a radio network node (e.g., macro eNB 102 and/or pico eNB 112) for controlling output transmission power from a UE of a radio communications network will be described in the context of the flowcharts of FIGS. 16-21.

Figure 16:
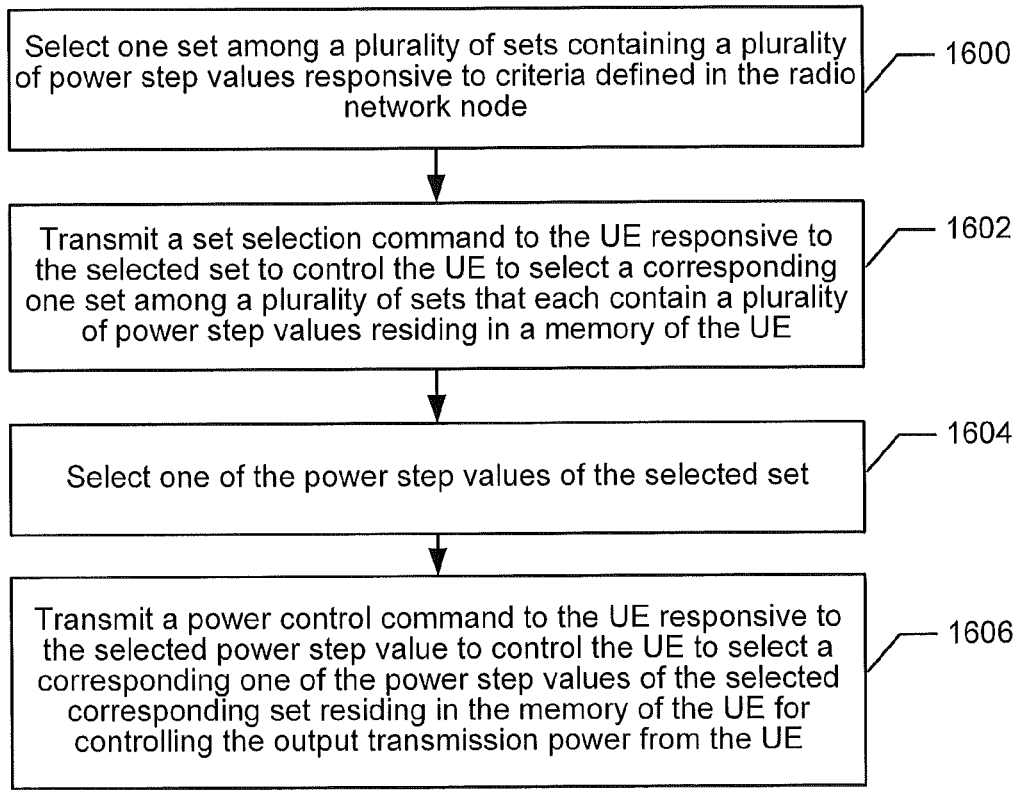
FIGS. 16-21 are flow charts of operations and methods that can be performed by radio network nodes control output transmission power from a UE according to some embodiments.

Referring to FIG. 16, the radio network node selects (block 1600) one set among a plurality of sets that each contain a plurality of power step values (e.g., select among the sets 1020a . . . 1020n of FIG. 10) responsive to criteria defined in the radio network node. At least some of the power step values are different between the sets. The radio network node transmits (block 1602) a set selection command to the UE responsive to the selected set to control the UE to select a corresponding one set among a plurality of sets that each contain a plurality of power step values residing in a memory of the UE. As noted above, the power step values residing in the memory of the UE may be stored in the UE before the UE initiates communication with the radio network, or may be communicated to the UE by the radio network and stored by the UE. The radio network node selects (block 1604) one of the power step values of the selected set, and transmits (block 1606) a power control command (e.g., the power control command value 1010 of FIG. 10) to the UE responsive to the selected power step value to control the UE to select a corresponding one of the power step values of the selected corresponding set residing in the memory of the UE for controlling the output transmission power from the UE.

Figure 17:
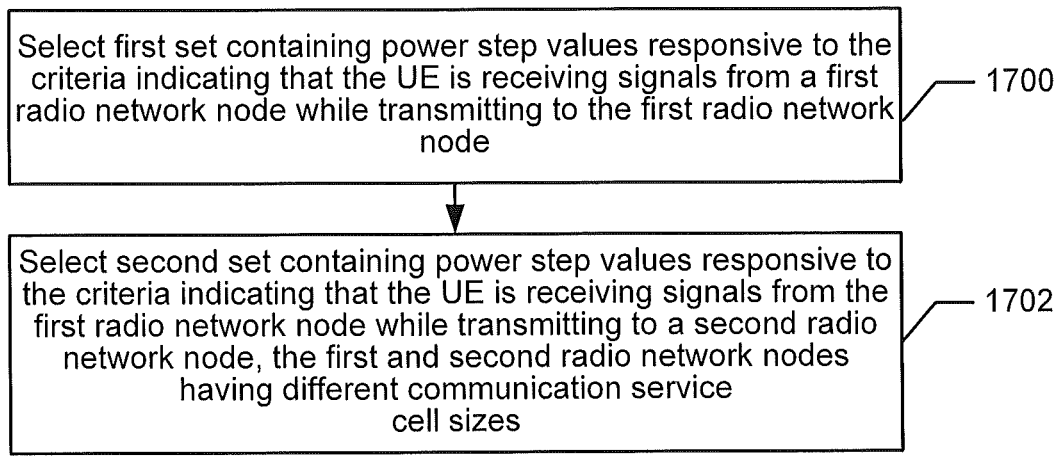

In a further embodiment shown in FIG. 17, the radio network node selects (block 1700) a first one of the sets responsive to the criteria indicating that the UE is receiving signals from a first radio network node while transmitting to the first radio network node. In contrast, the radio network node selects (block 1702) a second one of the sets responsive to the criteria indicating that the UE is receiving signals from the first radio network node while transmitting to a second radio network node. The first and second radio network nodes have different communication service cell sizes within a heterogeneous network, and the first radio network node may be a macro cell radio network node (e.g., macro eNB 102) the second radio network node may be a pico cell radio network node (e.g., pico eNB 112). The second set can comprise larger magnitude power step values than the first set to control the UE to make a larger power change responsive to the power control command.

Figure 18:
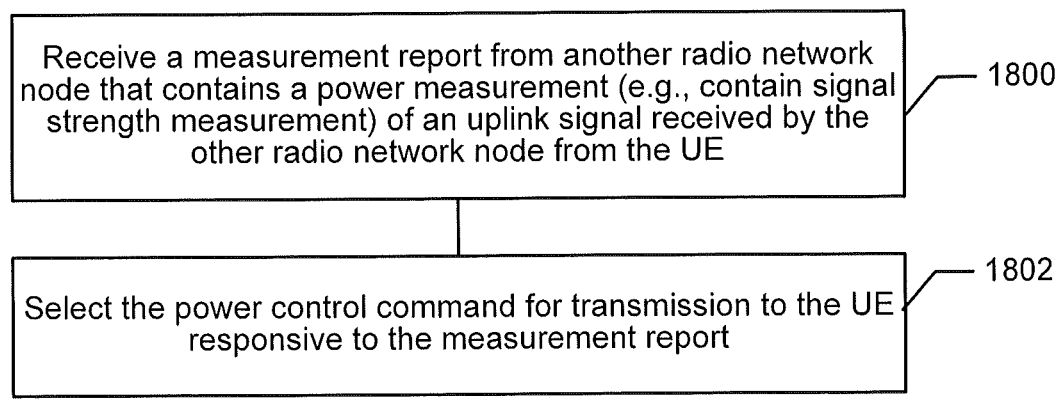

In a further embodiment shown in FIG. 18, the radio network node selects among the sets of accumulated power step values responsive to the UE uplink signal measurements at the other radio network node. For example, the radio network node can receive (block 1800) a measurement report from another radio network node that contains a power measurement of an uplink signal received by the other radio network node from the UE. The radio network node can select (block 1802) the power control command for transmission to the UE responsive to the measurement report. In a further illustrative example, the pico eNB 112 can measure power (e.g., a signal strength measurement) of an uplink signal received from the UE and can communicate a corresponding measurement report to the macro eNB 102 which selects a power control command that it transmits to the UE responsive to the measurement report (e.g., responsive to the signal strength measurement in the report).

Figure 19:
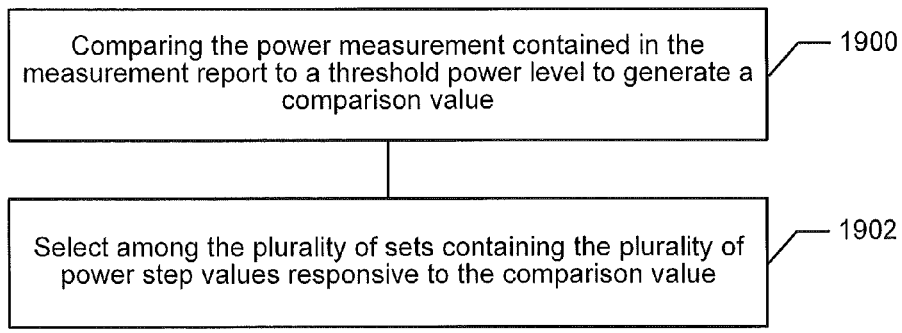

In a further embodiment shown in FIG. 19, the radio network node selects among the sets of accumulated power step values responsive to the UE uplink signal measurements at the other radio network node. For example, the radio network node can compare (block 1900) the power measurement contained in the measurement report to a threshold power level to generate a comparison value, and can select (block 1902) the one set among the plurality of sets responsive to the comparison value.

Figure 20:
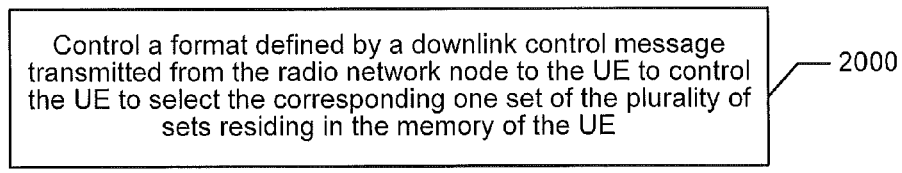

In a further embodiment shown in FIG. 20, the radio network node controls set selection by the UE using formats of downlink control messages transmitted to the UE. For example, the radio network node can control (block 2000) a format defined by a downlink control message transmitted to the UE to control the UE to select the corresponding one set of the plurality of sets residing in the memory of the UE.

Figure 21:
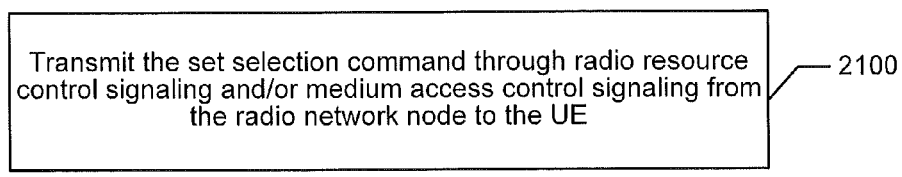

In a further embodiment shown in FIG. 21, the radio network node controls set selection by the UE using radio resource control signaling and/or medium access control signaling transmitted to the UE. For example, the radio network node can transmit (block 2100) the set selection command through radio resource control signaling and/or medium access control signaling to the UE.

Potential Advantages of at Least Some Embodiments

Radio communications networks implementing various of the embodiments disclosed herein may obtain improved closed-loop power control because of the faster power adjustment provided by the larger size power steps. This advantage can prove especially useful in certain heterogeneous networks scenarios where large UE transmit power mismatches can appear.

Example Radio Network Node and UE Configurations

Figure 22:
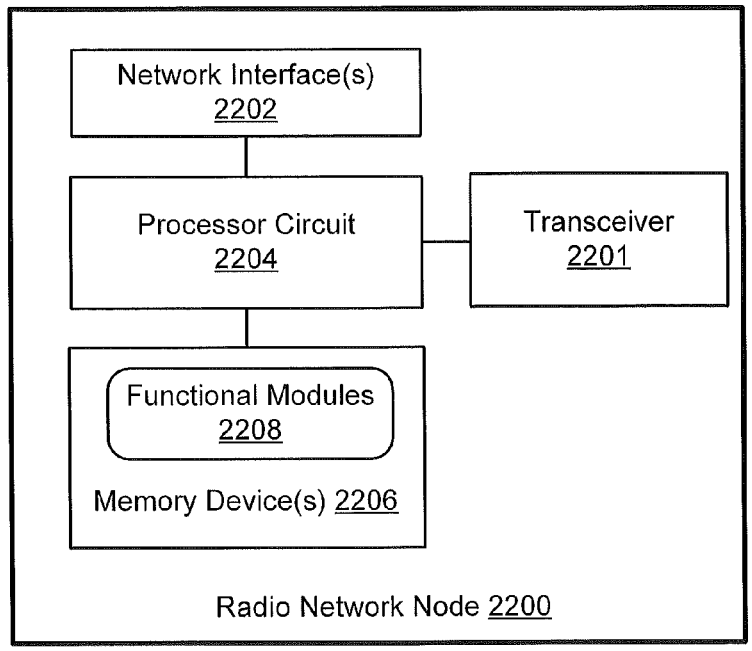
FIGS. 22 and 23 are block diagrams of a radio network node and a UE, respectively, configured according to some embodiments.

FIG. 22 is a block diagram of a radio network node 2200 configured according to some embodiments of the present invention, and elements of which may be included in one or more of the radio network nodes described above, such as the macro eNB 102 and/or the pico eNB 112. The radio network node 2200 can include one or more transceivers 2201, a network interface(s) 2202, a processor circuit 2204, and a memory device(s) 2206 containing functional modules 2208.

The transceiver(s) 2201 (e.g., 3GPP compliant transceiver) is configured to communicate with a UE via wireless air-interface channels according to operations and methods disclosed herein, and may communicate through an antenna array. By providing a plurality of antenna elements in the antenna array, the radio network node 2200 may receive MIMO communications allowing spatial multiplexing and/or diversity gain. A maximum number of uplink MIMO channels that may be received simultaneously by the radio network node 2200 may be equal to the number of antenna elements included in the antenna array.

The processor 2204 may include one or more data processing circuits, such as a general purpose and/or special purpose processor (e.g., microprocessor and/or digital signal processor). In particular embodiments, the processor 2204 is configured to execute computer program instructions from the functional modules 2208 of the memory device(s) 2206, described below as a computer readable medium, to perform at least some of the operations and methods described herein as being performed by a base station or other radio network node in accordance with one or more embodiments of the present invention. In alternative embodiments, processor 2204 may represent, in whole or in part, dedicated circuitry designed or configured to provide the described functionality, such as application-specific integrated circuits (ASICs), field-programmable gate arrays (FPGAs), or other circuitry capable of providing a fixed or semi-static set of functionality.

Figure 23:
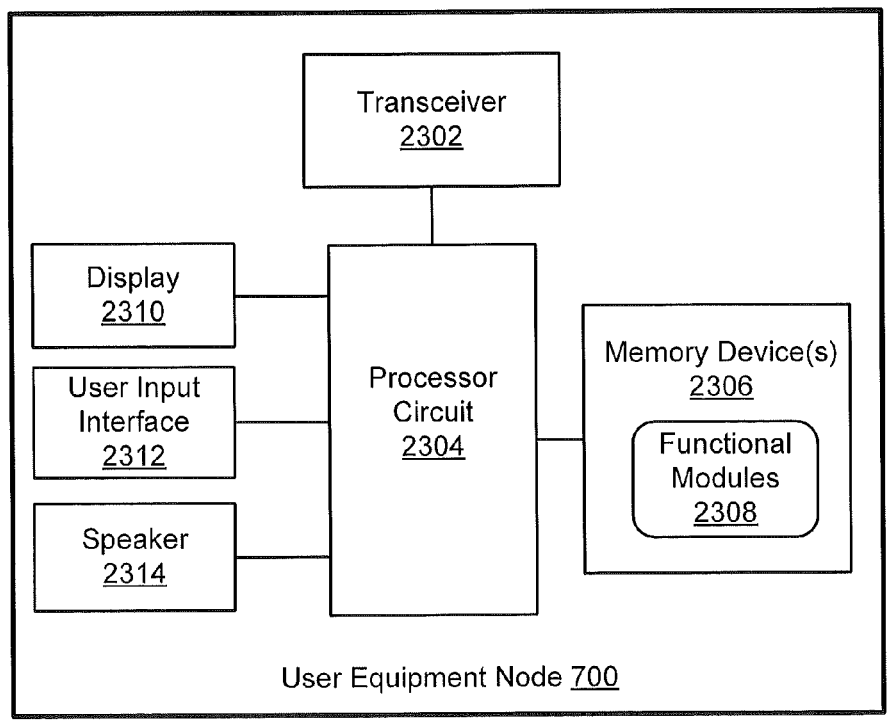

In accordance with some embodiments, the network interface 2202 is configured to receive measurement reports from another radio network node that contain power measurements of uplink signals received by the other radio network node from a UE. The processor 2204 is configured to select one among a plurality of sets that each contain a plurality of power step values responsive to criteria defined in the radio network node, wherein at least some of the power step values are different between the sets. The processor 2204 transmits a set selection command through the at least one transceiver to the UE responsive to the selection set to control the UE to select a corresponding one set among a plurality of sets that each contain a plurality of power step values residing in a memory of the UE. The processor 2204 selects one of the power step values of the selected set responsive to one of the measurement reports. The processor 2204 transmits a power control command through the at least one transceiver to the UE responsive to the selected power step value to control the UE to select a corresponding one of the power step values contained in the selected corresponding set residing in the memory of the UE for controlling the output transmission power from the UE to the other radio network node FIG. 23 is a block diagram of a UE 700 which is configured according to some embodiments of the present invention. The UE 700 includes transceiver(s) 2302, a processor circuit 2304, and a memory device(s) 2306 containing functional modules 2308. The UE 700 may further include other elements, such as a display 2310, a user input interface 2312, and a speaker 2314.

The transceiver 2302 is configured to communicate with a radio network node (e.g., base station, eNB) via wireless air-interface channels according to operations and methods disclosed herein, and may communicate through an antenna array. By providing a plurality of antenna elements in the antenna array, the UE 700 may receive MIMO communications allowing spatial multiplexing and/or diversity gain as discussed above. A maximum number of downlink MIMO channels that may be received simultaneously during multi-point and/or single-point MIMO by UE 700 may be equal to the number of antenna elements included in the antenna array.

The processor 2304 may include one or more data processing circuits, such as a general purpose and/or special purpose processor (e.g., microprocessor and/or digital signal processor). The processor 2304 is configured to execute computer program instructions from the functional modules 2308 of the memory device(s) 2306, described below as a computer readable medium, to perform at least some of the operations and methods described herein as being performed by a UE in accordance with one or more embodiments of the present invention.

In accordance with some embodiments, the transceiver(s) 2302 is configured to communicate with a plurality of radio network nodes in the radio communications network. The memory 2306 contains a plurality of sets that each containing a plurality of power step values. The processor is configured to select one set among the plurality of sets containing the power step values responsive to criteria defined in the UE, configured to receive a power control command through the at least one transceiver from a first radio network node, configured to select one of the power step values of the selected set responsive to the power control command, and configured to control output transmission power from the at least one transceiver to a second radio network node responsive to the selected power step value.

Abbreviations

| CL | closed loop |
|---|---|
| CoMP | coordinated multipoint |
| CRS | cell specific reference symbols |
| CSI-RS | Channel State Information Reference Signals |
| DCI | Downlink Control Information |
| DL | downlink |

-continued

| Hetnet | heterogeneous network |
|---|---|
| ICIC | inter-cell interference coordination |
| LTE | Long Term Evolution |
| MAC | medium access control |
| PC | power control |
| PCFICH | Physical Control Format Indicator CHannel |
| PDCCH | physical downlink control channel |
| PDSCH | physical downlink shared channel |
| PUSCH | physical uplink shared channel |
| PL | path loss |
| RAN | Radio Access Network |
| RRC | radio resource control |
| RRU | remote radio units |
| RS | reference signals |
| RSRP | reference signal received power |
| RSRQ | reference signal received quality |
| SINR | Signal to Interference Plus Noise Ratio |
| UE | User Equipment node |
| UL | Uplink |

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention. Thus, to the maximum extent allowed by law, the scope of the present invention is to be determined by the broadest permissible interpretation of the following claims and their equivalents, and shall not be restricted or limited by the foregoing detailed description. Any reference numbers in the claims are provided only to identify examples of elements and/or operations from embodiments of the figures/specification without limiting the claims to any particular elements, operations, and/or embodiments of any such reference numbers.

The invention claimed is:

1. A method in a wireless device of a radio communications network, for controlling output transmission power from the wireless device, the method comprising:
   selecting one set among a plurality of sets that each contain a plurality of power step values, residing in a memory of the wireless device, responsive to criteria defined in the wireless device, by selecting a first one of the sets responsive to the criteria indicating that the wireless device is receiving signals from a first radio network node while transmitting to the first radio network node and by selecting a second one of the sets responsive to the criteria indicating that the wireless device is receiving signals from the first radio network node while transmitting to a second radio network node, wherein at least some of the power step values are different between the sets;
   receiving a power control command in a downlink from the first radio network node of a heterogeneous network that also includes the second radio network node, the first radio network node providing a different communication service cell size than the second radio network node;
   selecting one of the power step values of the selected one of the sets responsive to the power control command; and
   controlling the output transmission power from the wireless device responsive to the selected power step value.

2. The method of claim 1, wherein:
   the second one of the sets comprises larger magnitude power step values than the first one of the sets to control the wireless device to make corresponding larger power changes responsive to the power control command.

3. The method of claim 2, wherein:
   the first radio network node is a macro cell radio network node; and
   the second radio network node is a pico cell radio network node.

4. The method of claim 1, wherein selecting one set among the plurality of sets containing the plurality of power step values comprises:
  receiving a downlink control message;
  identifying an uplink Downlink Control Information (DCI) format that is defined by the downlink control message; and
  selecting the one set among the plurality of sets responsive to the uplink DCI format defined by the downlink control message.

5. The method of claim 4, wherein selecting the one set among the plurality of sets responsive to the uplink DCI format defined by the downlink control message comprises:
  selecting a first one of the plurality of sets responsive to the uplink DCI format defined by the downlink control message indicating that the wireless device is transmitting uplink signals to a first cell of a heterogeneous network while receiving downlink signals from the first cell; and
  selecting a second one of the plurality of sets responsive to the uplink DCI format defined by the downlink control message indicating that the wireless device is transmitting uplink signals to a second cell of the heterogeneous network while receiving downlink signals from the first cell, wherein the first cell is larger than the second cell.

6. The method of claim 5, wherein:
  the second one of the plurality of sets comprises larger magnitude power step values than the first one of the plurality of sets to control the wireless device to make a larger power change responsive to the power control command.

7. The method of claim 1, wherein selecting one among the plurality of sets containing the plurality of power step values comprises:
  receiving radio resource control signaling and/or medium access control signaling; and
  selecting among the plurality of sets responsive to the radio resource control signaling and/or the medium access control signaling.

8. The method of claim 1, wherein selecting one among the plurality of sets containing the plurality of power step values comprises:
  receiving a present set of path loss measurement reference symbols;
  identifying that the present set of path loss measurement reference symbols is different than a previous set of path loss measurement reference symbols that were earlier received; and
  selecting among the plurality of sets responsive to the identified difference.

9. A method in a radio network node of a radio communications network for controlling output transmission power from a wireless device of, the method comprising:
  selecting one set among a plurality of sets that each contain a plurality of power step values responsive to criteria defined in the radio network node, by selecting a first one of the sets responsive to the criteria indicating that the wireless device is receiving signals from a first radio network node while transmitting to the first radio network node and selecting a second one of the sets responsive to the criteria indicating that the wireless device is receiving signals from the first radio network node while transmitting to a second radio network node, the first and second radio network nodes having different communication service cell sizes within a heterogeneous network, wherein at least some of the power step values are different between the sets;
  transmitting a set selection command to the wireless device responsive to the selected set to control the wireless device to select a corresponding one set among a plurality of sets that each contain a plurality of power step values residing in a memory of the wireless device;
  selecting one of the power step values of the selected set; and
  transmitting a power control command to the wireless device responsive to the selected power step value to control the wireless device to select a corresponding one of the power step values of the selected corresponding set residing in the memory of the wireless device for controlling the output transmission power from the wireless device.

10. The method in the radio network node of claim 9, further comprising:
  receiving a measurement report from another radio network node that contains a power measurement of an uplink signal received by the other radio network node from the wireless device; and
  selecting the power control command for transmission to the wireless device responsive to the measurement report.

11. The method in the radio network node of claim 10, wherein the power control command is selected responsive to a signal strength measurement contained in the measurement report for the uplink signal received by the other radio network node from the wireless device.

12. The method in the radio network node of claim 10,
  further comprising comparing the power measurement contained in the measurement report to a threshold power level to generate a comparison value, and
  wherein selecting one set among the plurality of sets containing the plurality of power step values comprises selecting the one set among the plurality of sets responsive to the comparison value.

13. The method in the radio network node of claim 9, wherein:
  the second one of the sets comprises larger magnitude power step values than the first one of the sets to control the wireless device to make a larger power change responsive to the power control command.

14. The method in the radio network node of claim 13, wherein:
  the first radio network node is a macro cell radio network node; and
  the second radio network node is a pico cell radio network node.

15. The method in the radio network node of claim 9, wherein transmitting the set selection command to the wireless device comprises:
  controlling an uplink Downlink Control Information (DCI) format defined by a downlink control message transmitted from the radio network node to the wireless device to control the wireless device to select the corresponding one set of the plurality of sets residing in the memory of the wireless device.

16. The method in the radio network node of claim 9, wherein transmitting the set selection command to the wireless device comprises:
  transmitting the set selection command through radio resource control signaling and/or medium access control signaling from the radio network node to the wireless device.

17. A wireless devices for use in a radio communications network, the wireless device comprising:
- at least one transceiver configured to communicate with a plurality of radio network nodes in the radio communications network;
- a memory configured to store a plurality of sets that each contain a plurality of power step values, wherein at least some of the power step values are different between the sets; and
- a processor circuit configured to select one set among the plurality of sets containing the power step values responsive to criteria defined in the wireless device, configured to receive a power control command. through the at least one transceiver from a first radio network node, configured to select one of the power step values of the selected set responsive to the power control command, and configured to control output transmission power from the at least one transceiver to a second radio network node responsive to the selected power step value,
- wherein the processor circuit selects the one set among the plurality of sets by selecting a first one of the sets responsive to the criteria indicating that the wireless device is receiving signals from the first radio network node while transmitting to the first radio network node and by selecting a second one of the sets responsive to the criteria indicating that the wireless device is receiving signals from the first radio network node while transmitting to the second radio network node.

18. A radio network node of a radio communications network, the radio network node comprising:
- a network interface configured to receive measurement reports from another radio network node that contain power measurements of uplink signals received by the other radio network node from a wireless device;
- at least one transceiver configured to transmit signals to the wireless device; and
- a processor circuit configured to:
  - select one among a plurality of sets that each contain a plurality of power step values responsive to criteria defined in the radio network node, by selecting a first one of the sets responsive to the criteria indicating that the wireless device is receiving signals from the radio network node while transmitting to the radio network node and by selecting a second one of the sets responsive to the criteria indicating that the wireless device is receiving signals from the radio network node while transmitting to the other radio network node, wherein at least some of the power step values are different between the sets;
  - transmit a set selection command through the at least one transceiver to the wireless device responsive to the selection set to control the wireless device to select a corresponding one set among a plurality of sets that each contain a plurality of power step values residing in a memory of the wireless device;
  - select one of the power step values of the selected set responsive to one of the measurement reports; and
  - transmit a power control command through the at least one transceiver to the wireless device responsive to the selected power step value to control the wireless device to select a corresponding one of the power step values contained in the selected corresponding set residing in the memory of the wireless device, for controlling the output transmission power from the wireless device to the other radio network node.

\* \* \* \* \*

UNITED STATES PATENT AND TRADEMARK OFFICE
CERTIFICATE OF CORRECTION

| | |
|---|---|
| PATENT NO. | : 8,849,339 B2 |
| APPLICATION NO. | : 13/463119 |
| DATED | : September 30, 2014 |
| INVENTOR(S) | : Anto et al. |

Page 1 of 1

It is certified that error appears in the above-identified patent and that said Letters Patent is hereby corrected as shown below:

In the Specification

In Column 3, Line 10, delete "(PDSCH)." and insert -- (PUSCH). --, therefor.

In Column 9, Line 67, delete "Si" and insert -- S1 --, therefor.

In the Claims

In Column 21, Line 53, in Claim 9, delete "device of," and insert -- device, --, therefor.

In Column 23, Line 1, in Claim 17, delete "devices" and insert -- device --, therefor.

In Column 23, Line 13, in Claim 17, delete "command." and insert -- command --, therefor.

In Column 24, Line 31, in Claim 18, delete "device," and insert -- device --, therefor.

Signed and Sealed this
Nineteenth Day of May, 2015

Michelle K. Lee
*Director of the United States Patent and Trademark Office*